Feb. 20, 1968 J. E. NELSON 3,369,636
CONTROL OF SYNCHRONOUS MOTORS ON A COMMON DRIVE
Filed July 18, 1966
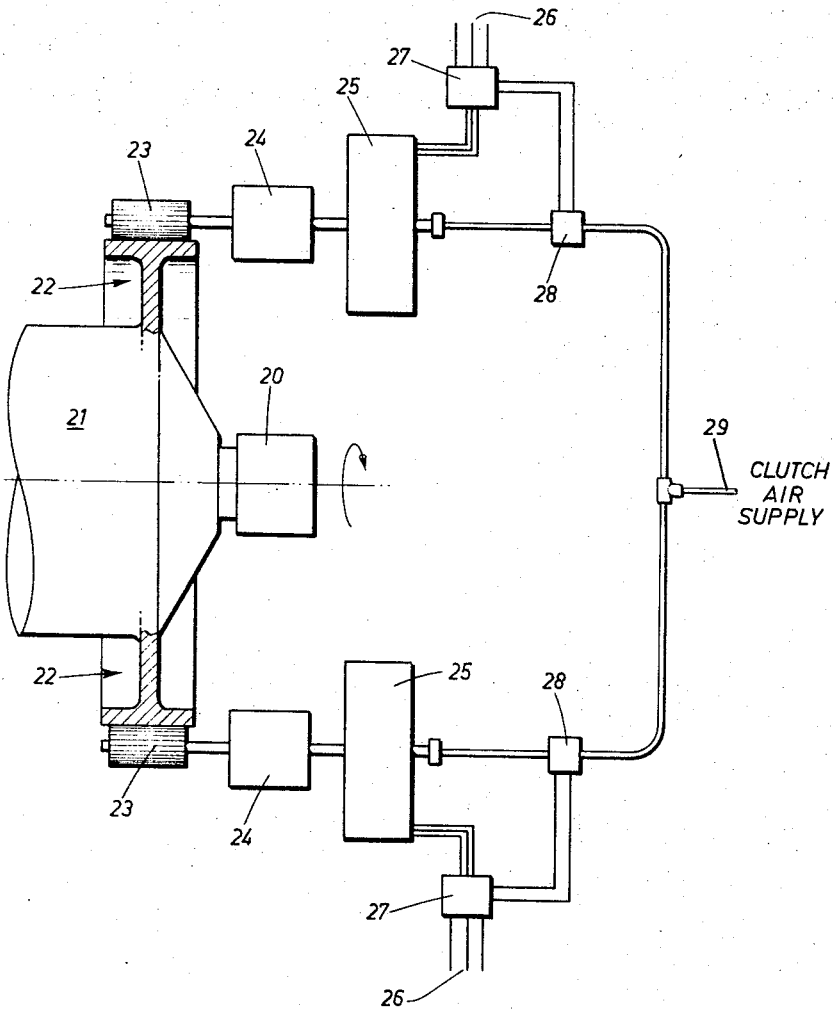
JOHN E. NELSON
INVENTOR.
BY R A Eclesley

United States Patent Office 3,369,636
Patented Feb. 20, 1968

3,369,636
CONTROL OF SYNCHRONOUS MOTORS
ON A COMMON DRIVE
John E. Nelson, Montreal, Quebec, Canada, assignor to
Dominion Engineering Works Limited, Quebec, Quebec,
Canada, a Canadian corporation
Filed July 18, 1966, Ser. No. 566,026
4 Claims. (Cl. 192—.2)

This invention is directed to a method of operating synchronous motors in a load sharing arrangement of a common output member, and to apparatus for carrying out the method.

In the operation of heavy machinery such as large grinding mills where it is not economic to drive the machine by a single synchronous motor, owing to limitations of gear sizes, it is the practice to employ a plurality of two or more synchronous electric motors, generally drivin a common gear wheel connected to the machine. Owing to different conditions such as initial motor installation and subsequent variations in the motor mounts, the condition arises that the relative angular position of the motor stators vary, relative to the rotor axis, which results in a change in the load angle relationship of individual motors. This in turn results in unequal load sharing between the motors, so that the proportion of load carried by individual motors may vary considerably from the design value, resulting in uneconomic loading of the motors and undue wear of the gearing connecting the individual motors to the common output member.

Previous practice to correct this condition has been directed to shimming of the stators of the individual motors in order to equalize the load factors of the synchronous machines. An alternative compensating method has been to provide adjustable coupling means between the rotor of one or more of the synchronous motors and the associated gearing to permit correction of the angular relationship therebetween, so as to correct the load angle relationship of the motor during its operation.

These former methods of correction have suffered from the disadvantages of being difficult to carry out, time consuming, expensive, and further, they do not ensure the continuance of proper load sharing between the individual synchronous motors.

An object of the present invention is to ensure correct load sharing between individual synchronous motors driving a common output member.

A further object of the present invention is the utilization of standard torque synchronous motors in place of high starting torque motors.

What is provided is a method of operating a plurality of synchronous electric motors in driving relation with a common output member to provide substantially equal loading of the motors, comprising the steps of: applying energizing voltage to the motors to produce rotation thereof; individually adjusting the phase relation of the rotor of each motor to the output member by limiting the starting torque applied by each rotor to the output member to a predetermined proportion of the full load torque, by a slip clutch means, and precluding further relative loading of the rotors on achievement of the desired load relation, whereby the phase relation of each rotor in the running condition is maintained in fixed load sharing relation with the other motors.

The invention thus provides a load sharing clutch arrangement for use with a plurality of synchronous motors driving a single rotary output member, comprising: at least two synchronous motors in driving relation with a single output member; individual clutch means connecting each motor to the output member; clutch control means to limit the value of torque transmitted by the clutches to a predetermined limiting value; load sensing means to determine a function of the load exerted on the clutches; and means connecting the load sensing means with the clutch control means to limit the load thereon to substantially the predetermined value, whereby on start-up the load is divided equally beween the synchronous motors.

Certain embodiments of the present invention are described by way of example, reference being had to the accompanying drawing which shows a grinding mill driven by a pair of synchronous motors connected thereto in accordance with the present invention.

Referring to the drawing, a grinding mill 21 is supported for rotation by end bearings 20, having a gear wheel 22 mounted thereon in driving relation.

A pair of similar synchronous motors 25 mounted parallel with the axis of the grinding mill 21 apply driving torque to twin pinions 23 by means of air clutches 24 interposed between the individual motors 25 and their respective pinions 23.

Operation of the air clutches 24 is controlled by means of solenoid operated control valves 28, each air valve 28 being actuated by a current sensitive switch 27 arranged in the electrical supply circuit 26 of the individual motors, air being supplied to the valve 28 from a common air supply 29.

In operation, the motors 25 are started with the clutches disengaged so that the motors are run up to synchronous speed in the unloaded condition. Operation of the solenoid valves 28 admits air to the clutches 24, whereby load is transmitted to the driving pinions 23 and the mill is started. Increase of air pressure admitted to the clutches raises the value of torque transmitted by each of the motors to the gear 22. On reaching a starting current corresponding to a predetermined proportion of full load current, such as 150%, the switches 27 are individually operated to cut off further supply of air to the related clutch 24, thus holding the torque transmitted by the related motor to the predetermined proportion of full load torque corresponding with the selected limiting current.

Before the mill reaches its full operating speed both motors will be operating at equal torque, and will thus be operating an equivalent load angles. Upon completion of acceleration of the mill, the torque requirement will diminish to the full load value, when all clutch slip ceases. The admission of full line air pressure to the clutches then locks the rotor of each of the motors in the established relative position, thus insuring that the motors each operate at substantially equal load angles, in the case of substantially identical machines.

A further advantage afforded by the present system is that any variations of performance of an individual clutch such as variations of the lining coefficient of friction, are substantially automatically compensated for by the system, since the control is by way of torque, with air pressures adjusted accordingly.

It will be understood that in the case where an asymmetric arrangement is adopted, the individual operating values of the control arrangement can be correspondingly adjusted to provide the desired final operating conditions.

What I claim as new and desire to secure by Letters Patent of the United States is:

1. A load sharing clutch arrangement for use with a plurality of synchronous electric motors driving a single rotary output member, comprising: at least two synchronous electric motors in driving relation with a single output member; individual clutch means connecting each said motor to the output member; clutch control means to limit the value of torque transmitted by a said clutch to a predetermined value; load sensing means to determine a function of the torque transmitted by said clutch; and means connecting said load sensing means with said clutch control means to limit the torque thereon to substantially said predetermined value, whereby on start up the load is divided equally between the motors.

2. A clutch arrangement as claimed in claim 1 wherein said clutch means comprises fluid operated clutches adapted to transmit torque in excess of normal full load torque transmitted in the running condition.

3. A clutch arrangement as claimed in claim 2 wherein said clutch means are air operated, said load sensing means maintaining air pressure supplied to the clutch at sufficient value to maintain the predetermined torque transmission value, whereby variations in individual clutch efficiencies are automatically compensated.

4. The method of operating a plurality of synchronous alternating current electric motors in driving relation with a common output member, to provide load sharing between individual motors, comprising the steps of applying energizing voltage to the motors to produce rotation thereof, individually adjusting the phase relation of each motor to the output member by limiting the starting torque applied by each motor thereto to a predetermined proportion of the full load torque, by operation of slip clutch means, and precluding further clutch loading on achievement of the desired loading relation, whereby the load angle relation of each said motor in the running condition is maintained in fixed load sharing relation with the other motors.

References Cited
UNITED STATES PATENTS

| | | | |
|---|---|---|---|
| 3,017,527 | 1/1962 | La Vallee | 310—101 |
| 3,076,906 | 2/1963 | Simo | 310—101 |

FOREIGN PATENTS

| | | |
|---|---|---|
| 1,106,635 | 1/1966 | Germany. |

CARLTON R. CROYLE, *Primary Examiner.*

C. LEEDOM, *Assistant Examiner.*